United States Patent
Bawaskar

(10) Patent No.: US 10,802,796 B1
(45) Date of Patent: Oct. 13, 2020

(54) DISTRIBUTED SORTED SET

(71) Applicant: Pivotal Software, Inc., San Francisco, CA (US)

(72) Inventor: Swapnil Bawaskar, Beaverton, OR (US)

(73) Assignee: Pivotal Software, Inc., San Francisco, CA (US)

( * ) Notice: Subject to any disclaimer, the term of this patent is extended or adjusted under 35 U.S.C. 154(b) by 401 days.

(21) Appl. No.: 15/419,828

(22) Filed: Jan. 30, 2017

(51) Int. Cl.
*G06F 7/08* (2006.01)
*G06F 16/22* (2019.01)

(52) U.S. Cl.
CPC .............. *G06F 7/08* (2013.01); *G06F 16/22* (2019.01)

(58) Field of Classification Search
CPC .......... G06F 7/08; G06F 16/22; G06F 16/951; Y10S 707/99937; Y10S 707/99933
USPC ........................................................ 707/753
See application file for complete search history.

(56) References Cited

U.S. PATENT DOCUMENTS

| | | | | |
|---|---|---|---|---|
| 8,914,323 B1* | 12/2014 | Allen | ................. | G06F 21/6218 707/623 |
| 2012/0278897 A1* | 11/2012 | Ang | .................... | H04L 61/2596 726/26 |
| 2013/0103729 A1* | 4/2013 | Cooney | ................. | G06F 16/188 707/831 |
| 2014/0201238 A1* | 7/2014 | Arauz-Rosado | ...... | G06F 16/278 707/770 |
| 2014/0344287 A1* | 11/2014 | Carvalho | .......... | G06F 16/24524 707/748 |
| 2014/0365527 A1* | 12/2014 | Fuchs | ................. | G06F 21/6227 707/786 |
| 2015/0304420 A1* | 10/2015 | Li | ........................ | H04L 67/1097 709/201 |
| 2016/0188591 A1* | 6/2016 | Bestler | ................ | G06F 16/2255 707/744 |
| 2016/0191509 A1* | 6/2016 | Bestler | ................ | G06F 16/2255 713/163 |
| 2016/0299944 A1* | 10/2016 | Isaacson | ............... | G06F 16/283 |
| 2016/0321294 A1* | 11/2016 | Wang | .................... | G06F 16/182 |

OTHER PUBLICATIONS

'apacheignite.readme.io' [online], "Queue and set," Jul. 31, 2015, [Retrieved on Sep. 7, 2017], Retrieved from the Internet: URL< https://apacheignite.readme.io/docs/queue-and-set >, 4 pages.

(Continued)

*Primary Examiner* — Hosain T Alam
*Assistant Examiner* — Nicholas E Allen
(74) *Attorney, Agent, or Firm* — Fish & Richardson P.C.

(57) ABSTRACT

Systems, methods, and computer program products of distributing sorted sets to multiple nodes of a distributed in-memory database system are described. The distributed in-memory database system is a database system based on key-value pairs. The system receives data records including user data and scores for sorting. The system maps the user data to keys in the key-value pairs. The system maps the scores to the values in the key-value pairs. The system then distributes the mapped key-value pairs to the nodes. The distributed in-memory database system is indexed on the values.

21 Claims, 2 Drawing Sheets

(56) References Cited

OTHER PUBLICATIONS

'docs.hazelcast.org' [online], "2.2. Distributed Queue," Chapter 2. Distributed Data Structures, Apr. 3, 2015, [Retrieved on Sep. 7, 2017], Retrieved from the Internet: URL< http://docs.hazelcast.org/docs/3.0/manual/html/ch02s02.html >, 3 pages.

'docs.haxelcast.org' [online], "2.5. Distributed Set," Chapter 2. Distributed Data Structures, Apr. 5, 2015, [Retrieved on Sep. 7, 2017], Retrieved from the Internet: URL< http://docs.hazelcast.org/docs/3.0/manual/html/ch02s05.html >, 1 pages.

\* cited by examiner

DISTRIBUTED SORTED SET

This disclosure generally relates to data analysis in a cloud computing environment.

An in-memory database system stores data in memory of a computer system, whereas a conventional database system uses disks for storage. Compared to a conventional database system, an in-memory database system is faster and more efficient. This is because memory access is faster than disk access, and fewer instructions are needed for in-memory operations than for disk operations. An in-memory database system can support various data structures such as lists, maps sets, and sorted sets. Typically, in an in-memory database system, sizes of these data structures are limited by memory of an individual database server.

SUMMARY

This specification describes techniques of distributing a sorted set to multiple nodes of a distributed in-memory database system. The distributed in-memory database system is a key-value store based on key-value pairs. The system receives data records. Each data record includes user data and a score for sorting the record among the data records. The system maps the user data to keys in the key-value pairs of the key-value data store. The system maps the scores to the values in the key-value pairs of the key-value data store. The system then distributes the mapped key-value pairs to the nodes. The distributed in-memory database system is indexed on the values. Accordingly, the distributed in-memory database system supports operations that are specific to the sorted set, e.g., ranging.

The subject matter described in this specification can be implemented in various embodiments so as to realize one or more of the following advantages. For example, handling a sorted set requires indexing. The disclosed techniques provide indexing capabilities from a distributed in-memory key-value data store to the handling of the sorted set, thus brings speed and efficiency to the handling of the sorted set. The disclosed techniques improve scalability over conventional in-memory database systems by allowing concurrent processing and by utilizing multiple instances. The disclosed techniques allow horizontal scaling, by allowing addition of nodes to store a sorted set when the sorted set grows in size. The disclosed techniques improve data availability for sorted sets over conventional techniques. The disclosed techniques enable data replication across clusters over a wide area network.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
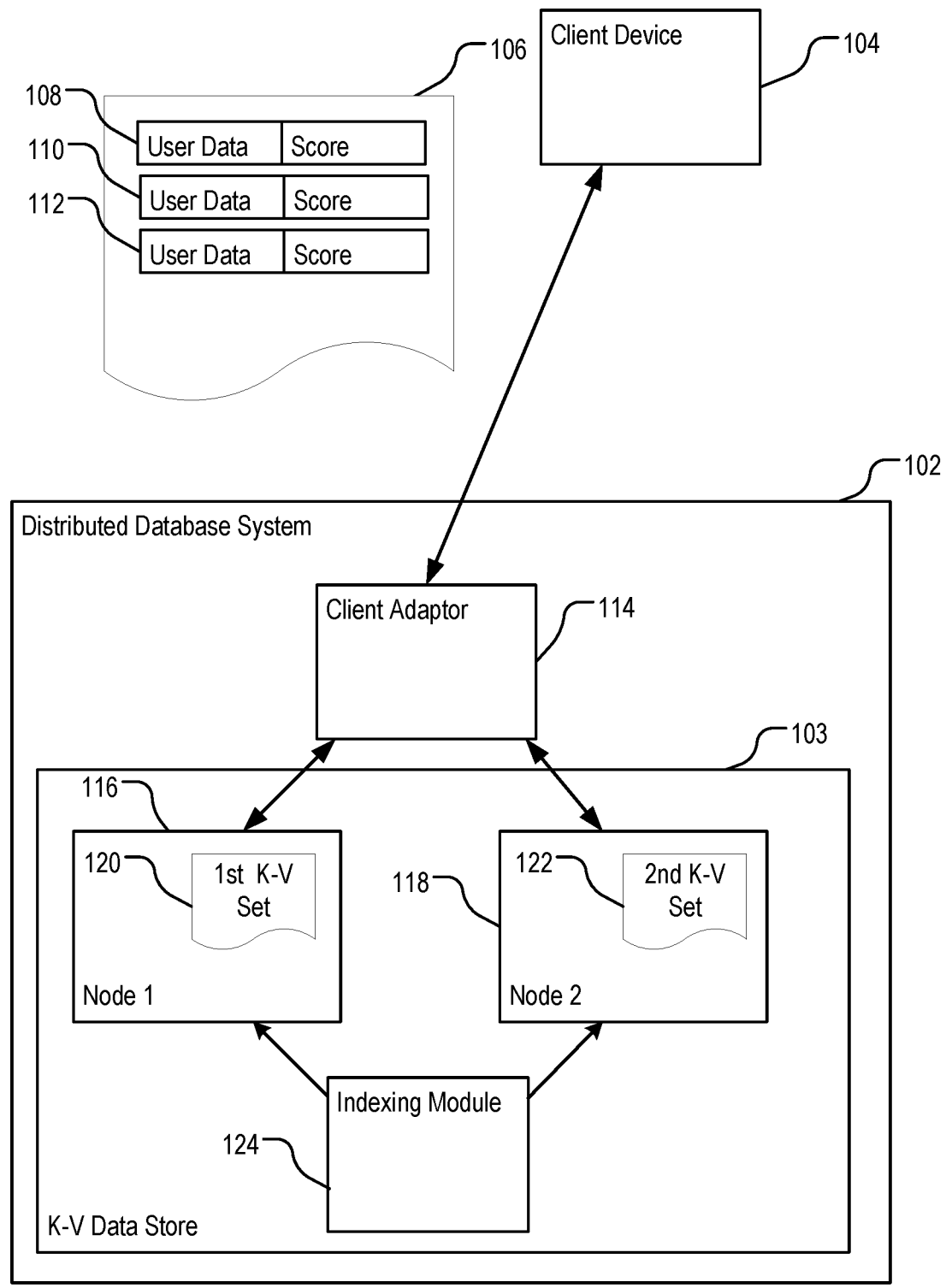
FIG. 1 is a block diagram illustrating example techniques of distributed sorted set.

FIG. 1 is a block diagram illustrating example techniques of distributed sorted set. The techniques of distributed sorted set is implemented on a distributed database system 102. The distributed database system 102 includes one or more nodes. Each node can include one or more computer processors and a respective memory. The distributed database system 102 can be an in-memory database system based on key-value pairs. The in-memory database system includes a key-value data store 103. The key-value data store 103 can implement a database paradigm where data storage is based on associative arrays of records. The database paradigm is different from a relational database paradigm. An example of the key-value data store 103 of the distributed database system 102 is Apache Geode® system.

A client device 104 communicates with the distributed database system 102 through a communications network. The client device 104 can be a client computer configured to issue commands for handling a sorted set data type. For example, the client device 104 can be a Redis® client. The client device 104 communicates with the distributed database system 102 through a communications network, e.g., the Internet. The client device 104 may be compatible with a database system that is different from the distributed database system 102. Accordingly, each command for handling the sorted set from the client device 104 is translated to a set of one or more commands of the distributed database system 102.

In the example shown, the client device 104 issues a command to create or populate a sorted set 106. The sorted set 106 can be a set data structure that includes one or more records, e.g., data records 108, 110 and 112. Each record can include a user data field and a score field. The user data field can store user data having a data type of, for example, integer, string or compound object. The score field can store a value based on which the record is sorted in the sorted set. An example command for creating or populating the sorted set 106 is an ZADD command of a Redis® system, which has the following format, as shown in Listing 1 below.

ZADD [set name] [score] [value]  (1)

The ZADD command in the example above adds a record to a sorted set identified by the [set name] parameter. If this sorted set does not exist yet, the distributed database system 102 creates the sorted set. The distributed database system 102 adds a record in the sorted set. The user data field of the added record has a value specified in the [value] parameter. This value can have a data type including, for example, integer, float, double, char, string, object or binary. The score field of the added record has a value specified in the [score] parameter. The sorted set 106 is sorted on the score field.

The distributed database system 102 includes a client adaptor 114. The client adaptor 114 is a component of the distributed database system 102 that adapts, e.g., translates, the command to create or populate the sorted set 106 to allow the sorted set 106 to be distributed among multiple nodes of the distributed database system 102. In the example shown, the nodes include nodes 116 and 118. Each of the nodes 116 and 118 can have respective non-transitory storage medium including memory, disk, or both.

The client adaptor 114 creates a data region for the sorted set 106. A data region is a logical unit for storing data on the distributed database system 102. A data region can be a distributed region or a non-distributed region. Data in a region can be distributed across the nodes 116 and 118 of the distributed database system 102. In the example shown, upon determining that the data type associated with command is a sorted set, the client adaptor 114 can create a partitioned data region. In the partitioned data region, the client adaptor 114 divides data of the sorted set 106 into buckets 120 and 122 across the nodes 116 and 118.

The client adaptor 114 can create the partitioned data region using a set region type command and a create region command. For example, in an Apache Geode system, the client adaptor 114 can set a system property "regiontype" to "PARTITION_PERSISTENT" in a gfsh (Geode Shell) command-line interface and then create the data region, or create the data region using the example gfsh command as shown below in Listing 2.

create region --name=[name]--type=PARTITION_PERSISTENT (2)

The name of the region can be the same as the name of the sorted set 106. The "PARTITION_PERSISTENT" parameter specifies that the region is a partitioned region. The client adaptor 114 can create a respective partitioned region for each sorted set.

In each of the buckets 120 and 122, data is stored as key-value pairs. The client adaptor 114 designates the user data in the data records 108, 110 and 112 as the keys of the key-value pairs. The client adaptor 114 designates the scores in the data records 108, 110 and 112 as the values of the key-value pairs.

The distributed database system 102 includes an indexing module 124. The indexing module 124 is configured to create an index on the key-value pairs based on the values in the key-value pairs. The indexing module 124 can create the index in response to a define index command from the client adaptor 114. The client adaptor 114 can issue the command in response to receiving the command to create or populate a sorted set 106 from the client device 104. An example define index command in gfsh of an Apache Geode system is shown below in Listing 3.

define index --name=[name]--expression=[exp]--region=[region] (3)

In the define index command, the client adaptor 114 can define a name of the index in the [name] parameter. The client adaptor 114 defines the index values in the [exp] parameter. The client adaptor 114 defines the index values as the values of the key-value pairs, which, in turn, are the scores in the data records 108, 110 and 112 in the sorted set 106. The client adaptor 114 defines a data region to index on in the [region] parameter by the name of the data region, which, in turn, is the name of the sorted set 106 as specified in the command from the client device 104, e.g., the ZADD command as described above.

The sorted set 106 is stored in respective memories of the nodes 116 and 118, according to data distribution rules provided by the distributed database system 102. In batch mode or as command line input, the client device 104 can add records to the sorted set 106. The added records are distributed among the nodes 116 and 118. The size of the sorted set 106 is not limited to size of memory of a standalone computer as in conventional technology. The distributed database system 102 can provision additional nodes to the data region as necessary, to accommodate the size of the sorted set 106.

The index created by the indexing module 124 enables operations that relate to the order of the sorted set 106. For example, the client adaptor 114 receives a command from the client device 104 to retrieve the first N, e.g., five, records from the sorted set 106. The first N records can be records having the lowest or highest score. The client adaptor 114 then retrieves respective first N records from each of the nodes 116 and 118 based on the index. The client adaptor 114 then selects the first N records from the 2*N retrieved records based on scores, and returns the selected N records to the client device 104.

As described above, the operations of the client adaptor 114 enable the distributed database system 102, e.g., an Apache Geode system, conventionally not configured to handle a sorted set data structure, to be able to accept commands for creating, populating, and manipulating sorted sets. Likewise, the operations of the client adaptor 114 enable a client device 104 of a system, e.g., a Redis system, conventionally not configured to handle a sorted set in a distributed manner, to use data distribution capabilities of the distributed database system 102 by issuing the commands for creating, populating, and manipulating sorted sets.

Figure 2:
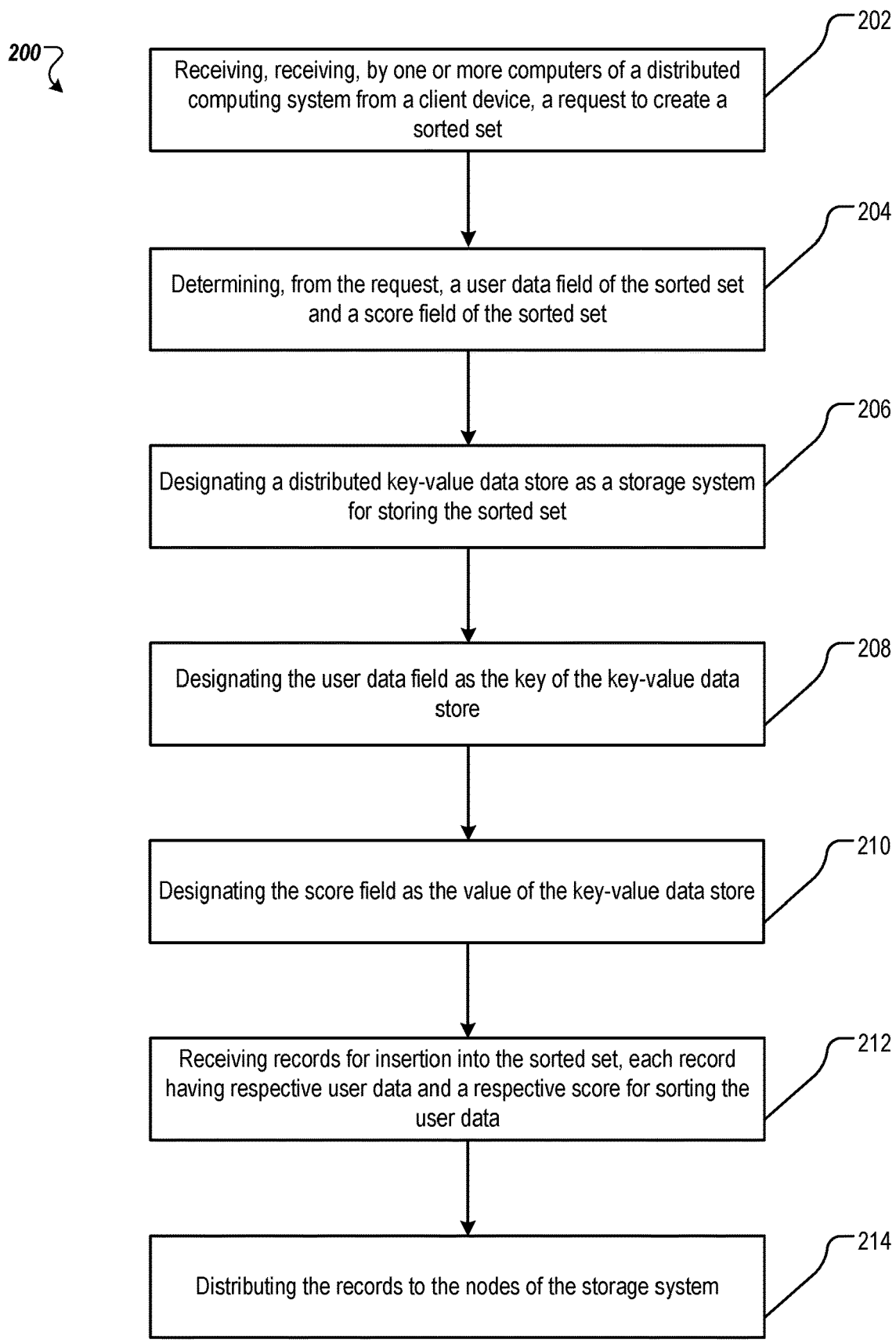
FIG. 2 is a flowchart illustrating an example process of distributing a sorted set.

FIG. 2 is a flowchart illustrating an example process 200 of distributing a sorted set. The process 200 can be performed by a system including one or more computers, e.g., the distributed database system 102 of FIG. 1.

The system receives (202) a request to create a sorted set. The request can be an add record command, e.g., the ZADD command of a Redis system. The system can determine, by command name, that the command is a command related to a sorted set. The system can determine that sorted set does not exist yet, and designate the command as the request to create a sorted set.

The system determines (204), from the request, a user data field of the sorted set and a score field of the sorted set. Determining the user data field and score field can be based on positions of the parameters of the command to add the record and a format of the command, or by parameter name.

The system designates (206) a distributed key-value data store as a storage system for storing the sorted set. The distributed key-value data store, e.g., the distributed key-value data store 103 of FIG. 1, is implemented on multiple nodes of the system. Each node includes a respective non-transitory storage device, e.g., memory. The distributed key-value data store can be an in-memory database. The distributed key-value data store can be an Apache Geode system.

The system designates (208) the user data field as the key of the key-value data store. The system can enforce uniqueness of the keys based on enforcement of uniqueness of elements in the sorted set. The user data field can have any data type permitted in a sorted set.

The system designates (210) the score field as the value of the key-value data store. Accordingly, the system maps a structure of the sorted set into the key-value data store. The sorted set can correspond to a dedicated partitioned region of the distributed key-value data store. The partitioned region includes a logical data region distributed among the nodes. For each node, the system can provision storage space, e.g., memory space, to allow for region data storage, including no local storage at all. The node can access all region data regardless of how much is stored locally.

The system receives (212) records for insertion into the sorted set. Each record has respective user data and a respective score for sorting the user data. The first record of the records can be associated with the first ZADD command that caused the system to create the sorted set.

The system distributes (214) the records to the nodes of the storage system. Distributing the records can include storing the user data and corresponding scores as key-value pairs on the nodes and indexing the key-value pairs on the values of the key value pairs. The indexing ensures a sort order of the sorted set is preserved.

The system can receive a request for a number of sorted records based on a sort order, e.g., the first N records or last N records. In response to the request, the system retrieves respective N sorted records from each of the nodes. The system aggregates the retrieved records. The system then selects N sorted records from the aggregated records as a response to the request.

The system can provide an adaptor, e.g., the client adaptor 114 of FIG. 1, that translates a create or populate sorted set command to multiple commands of creating a partitioned region for the sorted set, mapping the records to the key-value pairs, and indexing the key-value pairs. The create or populate sorted set command can be, for example, a ZADD command of a Redis system. The commands of creating a partitioned region for the sorted set, mapping the records to the key-value pairs, and indexing the key-value pairs can be, for example, various commands of an Apache Geode system.

The adaptor can translate a command manipulating the sorted set into one or more commands manipulating the key-value pairs. The command manipulating the sorted set can be a command intersecting the sorted set with another sorted set and storing a result of the intersecting, e.g., a ZINTERSTOR command of a Redis system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, by a client adaptor of a distributed computing system from a client device, a sorted-set command that operates on sorted sets, wherein the sorted-set command comprises a request to create, from a plurality of records, a sorted set,
   wherein each record of the plurality of records comprises a user data field and a score field;
   determining, from the request, the user data field of the sorted set and the score field of the sorted set;
   translating, by the client adaptor, the sorted-set command into a plurality of key-value pair commands that are compatible with the distributed computing system that operates on data regions of key-value pairs distributed among a plurality of nodes of the distributed computing system;
   executing the plurality of key-value pair commands on the distributed computing system to cause the distributed computing system to perform operations comprising:
     creating, in the distributed computing system, a partitioned data region corresponding to the sorted set,
     designating the user data field as a key of the partitioned data region,
     designating the score field as a value of the partitioned data region,
     generating a plurality of key-value pairs in the partitioned data region from the plurality of records, including generating a new key-value pair for each respective record of the plurality of records, and
     distributing the plurality of generated key-value pairs to the nodes of the distributed computing system that store data for the partitioned data region.

2. The method of claim 1, wherein the nodes of the distributed computing system comprise an in-memory database.

3. The method of claim 1, wherein the partitioned data region includes a logical data region distributed among the nodes.

4. The method of claim 1, wherein the method further comprises:
   receiving, by the client adaptor, a first retrieval command to retrieve one or more records of the sorted set, wherein the first retrieval command is compatible with the sorted-set system that operates on sorted sets;
   translating, by the client adaptor, the first retrieval command into one or more second retrieval commands to retrieve one or more key-value pairs corresponding to the one or more records and stored in the partitioned data region of the distributed computing system, wherein the one or more second retrieval commands are compatible with the distributed computing system that operates on data regions of key-value pairs distributed among a plurality of nodes; and
   executing the one or more second retrieval commands to cause the distributed computing system to perform operations comprising:
     retrieving the one or more key-value pairs from the partitioned data region, and
     sending, to the client device, user data and scores of the one or more key-value pairs.

5. The method of claim 4,
   wherein the first retrieval command specifies retrieval of the one or more records according to a sort order; and
   wherein sending the user data and scores of the one or more key-value pairs comprises sending the one or more records to the client device according to the sort order.

6. The method of claim 1, wherein the method further comprises:
   receiving, by the client adaptor, a first modification command to modify one or more records of the sorted set, wherein the first modification command is compatible with the sorted-set system that operates on sorted sets and specifies modifications to data of the one or more records;

translating, by the client adaptor, the first modification command into one or more second modification commands to modify data for one or more key-value pairs corresponding to the one or more records and consistent with the modifications specified in the first modification command, wherein the one or more second modification commands are compatible with the distributed computing system that operates on data regions of key-value pairs distributed among a plurality of nodes; and executing the one or more second modification commands to cause the distributed computing system to perform operations comprising modifying the data of the one or more key-values pairs according to one or more second modification commands.

7. The method of claim 1, wherein the sorted-set command is compatible with a sorted-set system.

8. One or more non-transitory computer readable storage media storing instructions executable by a data processing apparatus and upon such execution cause the data processing apparatus to perform first operations comprising:

receiving, by a client adaptor of a distributed computing system from a client device, a sorted-set command that operates on sorted sets, wherein the sorted-set command comprises a request to create, from a plurality of records, a sorted set;

wherein each record of the plurality of records comprises a user data field and a score field;

determining, from the request, the user data field of the sorted set and the score field of the sorted set;

translating, by the client adaptor, the sorted-set command into a plurality of key-value pair commands that are compatible with the distributed computing system that operates on data regions of key-value pairs distributed among a plurality, of nodes of the distributed computing system;

executing the plurality of key-value pair commands on the distributed computing system to cause the distributed computing system to perform second operations comprising:

creating, in the distributed computing system, a partitioned data region corresponding to the sorted set, designating the user data field as a key of the partitioned data region, designating the score field as a value of the partitioned data region, generating a plurality of key-value pairs in the partitioned data region from the plurality of records, including generating a new key-value pair for each respective record of the plurality of records, and distributing the plurality of generated key-value pairs to the nodes of the distributed computing system that store data for the partitioned data region.

9. The one or more non-transitory computer readable storage media of claim 8, wherein the nodes of the distributed computing system comprise an in-memory database.

10. The one or more non-transitory computer readable storage media of claim 8, wherein, the partitioned data region includes a logical data region distributed among the nodes.

11. The one or more non-transitory computer-readable media of method of claim 8, wherein the first operations further comprise:

receiving, by the client adaptor, a first retrieval command to retrieve one or more records of the sorted set, wherein the first retrieval command is compatible with the sorted-set system that operates on sorted sets;

translating, by the client adaptor, the first retrieval command into one or more second retrieval commands to retrieve one or more key-value pairs corresponding to the one or more records and stored in the partitioned data region of the distributed computing system, wherein the one or more second retrieval commands are compatible with the distributed computing system that operates on data regions of key-value pairs distributed among a plurality of nodes; and executing the one or more second retrieval commands to cause the distributed computing system to perform operations comprising:

retrieving the one or more key-value pairs from the partitioned data region, and sending, to the client device, user data and scores of the one or more key-value pairs.

12. The one or more non-transitory computer readable media of claim 11, wherein the first retrieval command specifies retrieval of the one or more records according to a sort order; and wherein sending the user data and scores of the one or more key-value pairs comprises sending the one or more records to the client device according to the sort order.

13. The one or more non-transitory computer readable media of claim 8, wherein the first operations further comprise:

receiving, by the client adaptor, a first modification command to modify one or more records of the sorted set, wherein the first modification command is compatible with the sorted-set system that operates on sorted sets and specifies modifications to data of the one or more records;

translating, by the client adaptor, the first modification command into one or more second modification commands to modify data for one or more key-value pairs corresponding to the one or more records and consistent with the modifications specified in the first modification command, wherein the one or more second modification commands are compatible with the distributed computing system that operates on data regions of key-value pairs distributed among a plurality of nodes; and executing the one or more second modification commands to cause the distributed computing system to perform operations comprising modifying the data of the one or more key-values pairs according to one or more second modification commands.

14. The one or more non-transitory computer readable media of claim 8, wherein the sorted-set command is compatible with a sorted-set system.

15. A system comprising:

one or more computers and one or more storage devices on which are stored instructions that are operable, when executed by the one or more computers, to cause the one or more computers to perform first operations comprising:

receiving, by a client adaptor of a distributed computing system from a client device, a sorted-set command that operates on sorted sets, wherein the sorted-set command comprises a request to create, from a plurality of records, a sorted set, wherein each record of the plurality of records comprises the user data field and the score field;

determining, from the request, a user data field of the sorted set and a score field of the sorted set;

translating, by the client adaptor, the sorted-set command into a plurality of key-value pair commands that are compatible with the distributed computing system that operates on data regions of key-value pairs distributed among a plurality of nodes of the distributed computing system;

executing the plurality of key-value pair commands on the distributed computing system to cause the distributed computing system to perform second operations comprising:

creating, in the distributed computing system, a partitioned data region corresponding to the sorted set, designating the user data field as a key of the partitioned data region, designating the score field as a value of the partitioned data region, generating a plurality of key-value pairs in the partitioned data region from the plurality of records, including generating a new key-value pair for each respective record of the plurality of records, and distributing the plurality of generated key-value pairs to the nodes of the distributed computing system that store data for the partitioned data region.

16. The system of claim 15, wherein the nodes of the distributed computing system comprise an in-memory database.

17. The system of claim 15, wherein, the partitioned data region includes a logical data region distributed among the nodes.

18. The system of claim 15, wherein the first operations further comprise:

receiving, by the client adaptor, a first retrieval command to retrieve one or more records of the sorted set, wherein the first retrieval command is compatible with the sorted-set system that operates on sorted sets;

translating, by the client adaptor, the first retrieval command into one or more second retrieval commands to retrieve one or more key-value pairs corresponding to the one or more records and stored in the partitioned data region of the distributed computing system, wherein the one or more second retrieval commands are compatible with the distributed computing system that operates on data regions of key-value pairs distributed among a plurality of nodes; and executing the one or more second retrieval commands to cause the distributed computing system to perform operations comprising:

retrieving the one or more key-value pairs from the partitioned data region, and sending, to the client device, user data and scores of the one or more key-value pairs.

19. The system of claim 18, wherein the first retrieval command specifies retrieval of the one or more records according to a sort order; and wherein sending the user data and scores of the one or more key-value pairs comprises sending the one or more records to the client device according to the sort order.

20. The system of claim 15, wherein the first operations further comprise:

receiving, by the client adaptor, a first modification command to modify one or more records of the sorted set, wherein the first modification command is compatible with the sorted-set system that operates on sorted sets and specifies modifications to data of the one or more records;

translating, by the client adaptor, the first modification command into one or more second modification commands to modify data for one or more key-value pairs corresponding to the one or more records and consistent with the modifications specified in the first modification command, wherein the one or more second modification commands are compatible with the distributed computing system that operates on data regions of key-value pairs distributed among a plurality of nodes; and executing the one or more second modification commands to cause the distributed computing system to perform operations comprising modifying the data of the one or more key-values pairs according to one or more second modification commands.

21. The system of claim 15, wherein the sorted-set command is compatible with a sorted-set system.

* * * * *